United States Patent
Hosking

(10) Patent No.: US 9,340,065 B2
(45) Date of Patent: May 17, 2016

(54) TURN LIMITED WHEEL LUG NUT AND NUT CAP

(71) Applicant: GM GLOBAL TECHNOLOGY OPERATIONS LLC, Detroit, MI (US)

(72) Inventor: James D. Hosking, Kilmore (AU)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 14/197,970

(22) Filed: Mar. 5, 2014

(65) Prior Publication Data

US 2015/0251487 A1 Sep. 10, 2015

(51) Int. Cl.
| | |
|---|---|
| *B60B 7/14* | (2006.01) |
| *B60B 3/16* | (2006.01) |
| *F16B 37/14* | (2006.01) |
| *B60B 7/06* | (2006.01) |

(52) U.S. Cl.
CPC .................. *B60B 3/165* (2013.01); *F16B 37/14* (2013.01); *B60B 7/068* (2013.01); *B60B 2900/572* (2013.01)

(58) Field of Classification Search
CPC ............ B60B 3/165; B60B 3/18; B60B 7/00; B60B 7/068
USPC ................. 301/37.31, 108.4, 37.375, 35.623, 301/37.374
See application file for complete search history.

(56) References Cited

U.S. PATENT DOCUMENTS

| | | | | |
|---|---|---|---|---|
| 2,588,372 | A * | 3/1952 | Erb ............................... | 411/432 |
| 4,968,202 | A * | 11/1990 | Lanham ........................ | 411/431 |
| 4,998,780 | A * | 3/1991 | Eshler et al. .............. | 301/37.375 |
| 5,082,409 | A * | 1/1992 | Bias ............................... | 411/431 |
| 5,181,767 | A * | 1/1993 | Hudgins et al. ........... | 301/37.375 |
| 5,667,281 | A * | 9/1997 | Ladouceur ............... | 301/37.375 |
| 5,842,749 | A * | 12/1998 | DiMarco ................... | 301/37.375 |
| 6,036,420 | A * | 3/2000 | Somers et al. ............... | 411/430 |
| 6,102,488 | A * | 8/2000 | Wilson ...................... | 301/35.623 |
| 6,196,637 | B1 * | 3/2001 | Hou et al. ................. | 301/37.375 |
| 6,318,942 | B1 * | 11/2001 | Wieczorek ................... | 411/431 |
| 6,592,314 | B1 * | 7/2003 | Wilson .......................... | 411/429 |
| 6,695,557 | B2 * | 2/2004 | Hove et al. ................... | 411/429 |
| 7,004,700 | B2 * | 2/2006 | Wilson ........................ | 411/372.6 |
| 7,172,380 | B2 * | 2/2007 | Lees et al. .................. | 411/372.5 |
| 7,252,471 | B1 * | 8/2007 | Manyoky et al. ............. | 411/533 |
| 8,016,535 | B1 * | 9/2011 | Roberts ......................... | 411/429 |
| 8,936,423 | B2 * | 1/2015 | Davis et al. ................... | 411/419 |
| 2002/0146301 | A1 * | 10/2002 | Wilson .......................... | 411/429 |
| 2003/0068212 | A1 * | 4/2003 | Wilson .......................... | 411/429 |
| 2004/0126202 | A1 * | 7/2004 | Somers et al. ................ | 411/429 |
| 2008/0193259 | A1 * | 8/2008 | Hill ............................... | 411/533 |
| 2010/0231029 | A1 * | 9/2010 | Russell ...................... | 301/37.31 |

* cited by examiner

*Primary Examiner* — Hau Phan
(74) *Attorney, Agent, or Firm* — Quinn Law Group, PLLC

(57) ABSTRACT

A turn limited wheel lug nut and nut cap combination is provided. The combination includes a lug nut for retaining a wheel on a vehicle. The lug nut has an external lobe. The combination also includes a nut cap, which is turnable with respect to the lug nut. The nut cap has an internal cam, which cooperates with the external lobe to locate the nut cap with respect to the lug nut with not more than a partial turn. The nut cap also has a stop, which cooperates with the external lobe to limit the partial turn of the nut cap with respect to the lug nut. And, the nut cap has a retention feature, which cooperates with the external lobe to retain the nut cap on the lug nut.

20 Claims, 3 Drawing Sheets

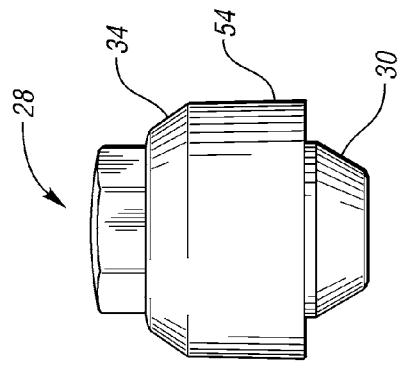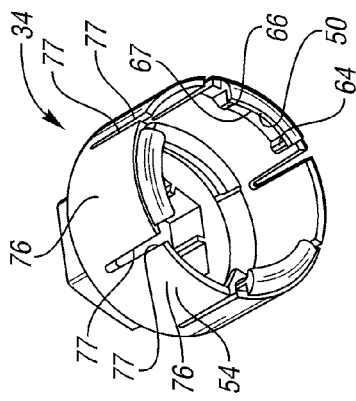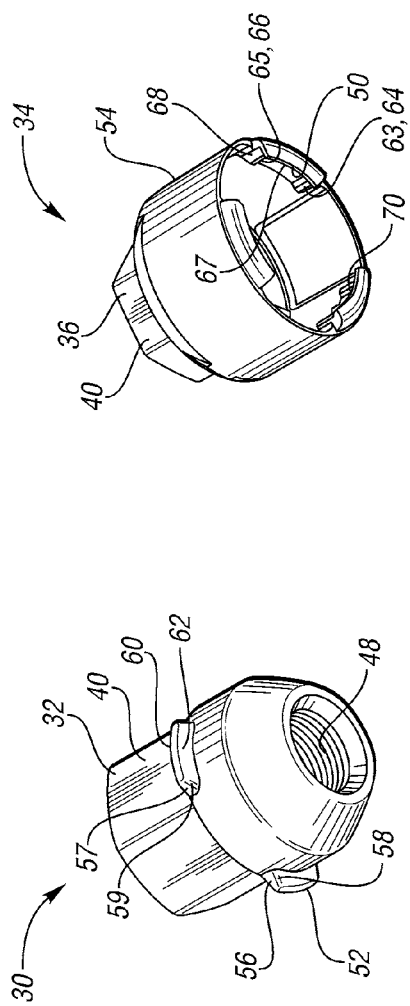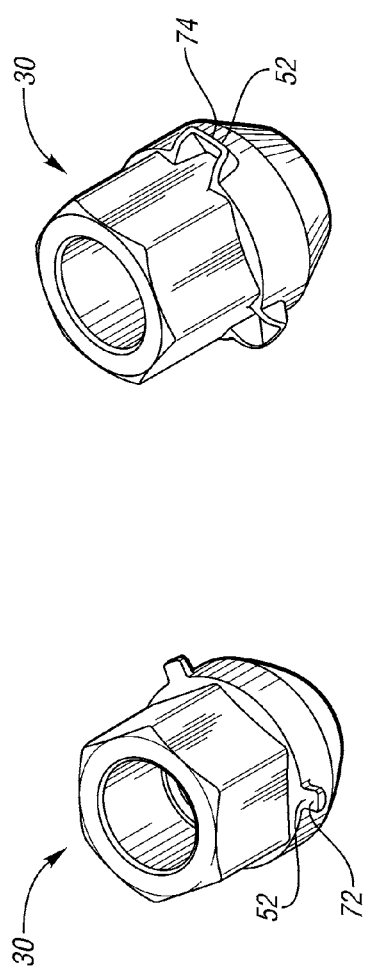

TURN LIMITED WHEEL LUG NUT AND NUT CAP

TECHNICAL FIELD

The invention for a vehicle relates to a turn limited wheel lug nut and nut cap combination or manufacture.

BACKGROUND OF THE INVENTION

Vehicle wheels are typically fastened to an axle via wheel mounting studs attached to the axle and lug nuts threaded onto the wheel mounting studs. The lug nuts are sometimes covered with a hub cap fastened to the wheel, but are often visible. Visible lug nuts are typically used on alloy wheels, and may be coated or capped (by incorporating a metal cap or by use of a separate plastic nut cap) for aesthetic purposes. Capped lug nuts require aesthetic lug nut design and are made using costly materials and manufacturing processes. Coated lug nuts also require aesthetic lug nut design, which results in more costly lug nut manufacturing processes. Coating materials and processes necessary to meet aesthetic appearance and corrosion resistance requirements are also costly. Current metal and plastic lug nut and nut cap combinations are costly to manufacture and can be difficult to install and/or remove. They often have matching multiple turn threads that are machined, rolled, or molded on both the lug nut and the nut cap. Alternatively, additional standard or special tools may be required for attaching the nut cap to the lug nut or for removing the nut cap from the lug nut.

SUMMARY OF THE INVENTION

A turn limited wheel lug nut and nut cap combination is provided. The combination includes a lug nut for retaining a wheel on a vehicle. The lug nut has an external lobe. The combination also includes a nut cap, which is turnable with respect to the lug nut. The nut cap has an internal cam, which cooperates with the external lobe to locate the nut cap with respect to the lug nut with not more than a partial turn. The nut cap also has a stop, which cooperates with the external lobe to limit the partial turn of the nut cap with respect to the lug nut. And, the nut cap has a retention feature, which cooperates with the external lobe to retain the nut cap on the lug nut.

The nut cap of the turn limited wheel lug nut and nut cap combination may include a rim configured to substantially conceal where the lug nut retains the wheel on the vehicle.

The nut cap of the turn limited wheel lug nut and nut cap combination may include a rim with an external rim lobe configured to preliminarily attach the nut cap to a wheel cover as a subassembly. The rim of the nut cap may also include a wheel cover retaining feature for attaching a wheel cover to the wheel via the lug nut.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3A is a schematic perspective view of the lug nut of FIG. 1 when the nut cap is dislocated from the lug nut;

FIG. 3B is a schematic perspective view of the nut cap of FIG. 1 when the nut cap is dislocated from the lug nut;

FIG. 3C is a side view of the lug nut and nut cap combination of FIG. 1 when the nut cap is located on the lug nut;

FIG. 4A is a schematic perspective view of an alternate embodiment of the lug nut of FIG. 1;

FIG. 4B is a schematic perspective view of another alternate embodiment of the lug nut of FIG. 1;

FIG. 5 is a schematic perspective view of an alternate embodiment of the nut cap of FIG. 1, separated from the lug nut;

DESCRIPTION OF THE PREFERRED EMBODIMENTS

Figure 1:
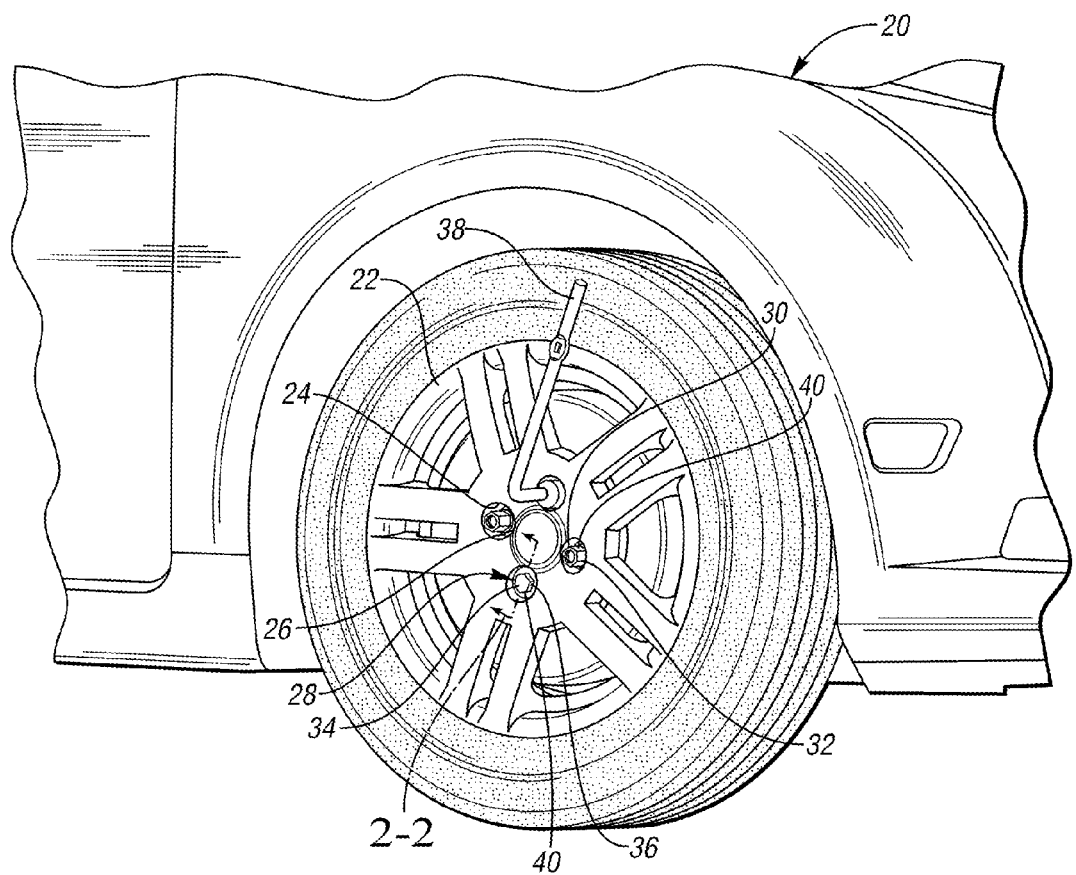
FIG. 1 is a fragmentary schematic perspective view of a wheel attached to a vehicle using an embodiment of the turn limited wheel lug nut and nut cap combination of this invention.

Referring to the drawings, wherein like reference numbers refer to like components throughout the views, FIG. 1 shows a first embodiment of a turn limited lug nut and nut cap combination 28. A vehicle 20, includes a wheel 22. The vehicle 20 may be any type of car, truck, sport utility vehicle, or any other type of wheeled vehicle. The wheel 22 may be made of an alloy, steel, or any other suitable structural material. The wheel 22 is retained on the vehicle 20 by a lug nut 30. The lug nut 30 may be made of an alloy, steel, or any other suitable structural material. The wheel 22 may include a lug nut hole 24 formed or machined in the wheel 22, which may provide clearance for the lug nut 30 and a tool 38, used for installation and removal of the lug nut 30. The wheel 22 may also include a lug nut hole base 26, where the lug nut 30 retains the wheel 22 on the vehicle 20. The lug nut 30 includes a first tool turnable configuration 32. The first tool turnable configuration 32 may be in the form of a hex 40 or any other configuration that may be turned by the tool 38.

A nut cap 34 may be used in combination with the lug nut 30 to cover the lug nut 30 for improved aesthetic appearance. The nut cap 34 may also be used to cover the lug nut hole base 26 for aesthetic purposes. The nut cap 34 may be made of a plastic, a non-metal, a metal, or any other suitable material. The nut cap 34 includes a second tool turnable configuration 36. The second tool turnable configuration 36 may be in the form of a hex 40 or any other configuration that may be turned by the tool 38. The first tool turnable configuration 32 and the second tool turnable configuration 36 may be substantially the same so that the tool 38 may be used to turn both the lug nut 30 and the nut cap 34.

Figure 2:
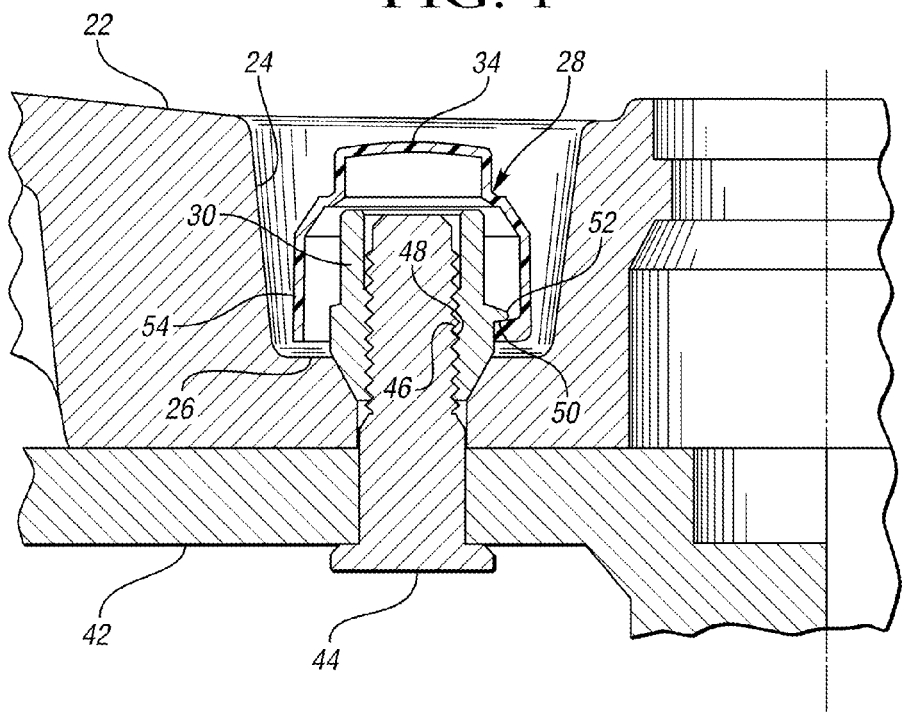
FIG. 2 is a fragmentary schematic side view section of FIG. 1 at the centerline of both the wheel and the turn limited lug nut and nut cap combination.

Referring now to FIG. 2, the vehicle 20, includes an axle 42 operatively connected to the vehicle 20. A wheel attachment or mounting stud 44 is attached to the axle 42. The wheel mounting stud 44 has a wheel attachment or mounting stud thread 46. The axle 42 and the wheel mounting stud 44 may be made of steel or any other suitable structural material. The lug nut 30 has a lug nut thread 48. The wheel mounting stud thread 46 and the lug nut thread 48 are configured to allow the lug nut 30 to be threaded onto the wheel mounting stud 44. Thus, the wheel 22 is attachable to the axle 42 on the wheel mounting stud 44 by threading the lug nut 30 onto the wheel mounting stud 44. The threads 46, 48 may be configured to tighten the wheel 22 against the axle 42 as the lug nut 30 is rotated in a clockwise direction with respect to the wheel mounting stud 44. Alternatively, the threads 46, 48 may be configured to tighten the wheel 22 against the axle 42 as the lug nut 30 is rotated in a counterclockwise direction with respect to the wheel mounting stud 44.

The lug nut 30 of the turn limited wheel lug nut and nut cap combination 28 includes an external lobe 52. The external lobe 52 may be a thread segment or may be some other shape that is not a thread segment. The external lobe 52 may be formed by rolling or machining processes or by processes other than rolling or machining. The external lobe 52 may be forged or may be manufactured by any other suitable process. The external lobe 52 may also be a separate part of the lug nut, made of metal, plastic, or any other suitable material, manufactured by forging, machining, molding, or any other suitable process, and attached to the lug nut 30 by pressing, clamping, crimping, strapping, welding, or any other suitable method. Embodiments of the external lobe 52 will be described in greater detail below.

The nut cap 34 of the turn limited wheel lug nut and nut cap combination 28 is turnable with respect to the lug nut 30 and includes an internal cam 50. The internal cam 50 is configured to cooperate with the external lobe 52 to locate the nut cap 34 with respect to the lug nut 30 with not more than a partial turn. Specifically, the internal cam 50 is configured to contact and/or interfere with the external lobe 52 to locate the nut cap 34 to the lug nut 30 as the nut cap 34 is turned clockwise with respect to the lug nut 30 and to dislocate the nut cap 34 from the lug nut 30 as the nut cap 34 is turned counterclockwise with respect to the lug nut 30. Alternatively, the internal cam 50 may be configured to contact and/or interfere with the external lobe 52 to locate the nut cap 34 to the lug nut 30 as the nut cap 34 is turned counterclockwise with respect to the lug nut 30 and to dislocate the nut cap 34 from the lug nut 30 as the nut cap 34 is turned clockwise with respect to the lug nut 30. Embodiments of the internal cam 50 will be described in greater detail below.

The nut cap 34 may also include a rim 54. The rim 54 may be configured to substantially cover the lug nut hole base 26 for aesthetic purposes and to substantially conceal where the lug nut 30 retains the wheel 22 on the vehicle 20.

Referring now to FIGS. 3A-3C, axial is defined as any direction parallel to the centerline of the lug nut 30 and the nut cap 34. Radial is defined as any direction perpendicular to the centerline of the lug nut 30 and the nut cap 34. The lug nut 30 external lobe 52 includes a radial lobe surface 60. The radial lobe surface 60 may be configured to contact and/or interfere with the internal cam 50 in the radial direction as the nut cap 34 is rotated with respect to the lug nut 30. The lug nut external lobe 52 also includes an axial lobe surface 62. The axial lobe surface 62 may be configured to contact and/or interfere with internal cam 50 in the axial direction as the nut cap 34 is rotated with respect to the lug nut 30.

The lug nut external lobe 52 may include a radial lobe lead-in 56. The radial lobe lead-in 56 may be configured to facilitate smooth cooperation between the external lobe 52 and the internal cam 50 in the radial direction as the nut cap 34 is rotated with respect to the lug nut 30. The radial lobe lead-in 56 may be a radius, a chamfer, or any other radial shape that provides for smooth cooperation between the external lobe 52 and the internal cam 50 in the radial direction as the nut cap 34 is rotated relative to the lug nut 30. The lug nut external lobe 52, may also include an axial lobe lead-in 58. The axial lobe lead-in 58 may be configured to facilitate smooth cooperation between the external lobe 52 and the internal cam 50 as the nut cap 34 is rotated with respect to the lug nut 30. The axial lobe lead-in 58 may be a radius, a chamfer, or any other axial shape that provides for smooth cooperation between the external lobe 52 and the internal cam 50 in the axial direction as the nut cap 34 is rotated relative to the lug nut 30.

The lug nut external lobe 52, may also include a radial lobe lead-out 57. The radial lobe lead-out 57 may be configured to facilitate smooth cooperation between the external lobe 52 and the internal cam 50 in the radial direction as the nut cap 34 is rotated with respect to the lug nut 30. The radial lobe lead-out 57 may be a radius, a chamfer, or any other radial shape that provides for smooth cooperation between the external lobe 52 and the internal cam 50 in the radial direction as the nut cap 34 is rotated relative to the lug nut 30. The lug nut external lobe 52, may also include an axial lobe lead-out 59. The axial lobe lead-out 59 may be configured to facilitate smooth cooperation between the external lobe 52 and the internal cam 50 in the axial direction as the nut cap 34 is rotated with respect to the lug nut 30. The axial lobe lead-out 59 may be a radius, a chamfer, or any other axial shape that provides for smooth cooperation between the lug nut external lobe 52 and the internal cam 50 in the axial direction as the nut cap 34 is rotated relative to the lug nut 30.

The nut cap 34 includes an axial cam surface 67. The axial cam surface 67 may be configured to contact and/or interfere with the lug nut axial lobe surface 62 in the axial direction as the nut cap 34 is rotated with respect to the lug nut 30 and when the nut cap 34 is located to the lug nut 30.

The nut cap 34 includes a stop 63. The stop 63 may be part of the internal cam 50. The stop 63 cooperates with the external lobe 52 to limit the partial turn of the nut cap 34 with respect to the lug nut 30. The stop 63 may operate by radial interference and/or contact with the external lobe 52 or the stop 63 may operate by axial interference and/or contact with the external lobe 52. Thus, the stop 63 may be configured as a radial stop 64, as described here, or as an axial stop 90, to be described in more detail with reference to FIG. 7A below. In the embodiment shown in FIGS. 3A-3C, radial interference and/or contact between the radial stop 64 and the external lobe 52 prevents the nut cap 34 from being turned beyond the radial stop 64. The stop 63 may limit the turn of the nut cap 34 with respect to the lug nut 30 to part of a turn. When the nut cap 34 is turned part of a turn to the stop 63, the nut cap 34 is located to the lug nut 30. The nut cap 34 may be dislocated from the lug nut 30 when the nut cap 34 is turned part of a turn with respect to the lug nut 30 in the opposite direction from the stop 63. Additionally, the stop 63 is shaped such that when an excessive torque is applied to the nut cap 34 by the tool 38, the stop 63 may be overcome and the nut cap 34 may be dislocated from the lug nut 30.

The nut cap 34 also includes a retention feature 65. The retention feature 65 may be part of the internal cam 50. The retention feature 65 cooperates with the external lobe 52 to retain the nut cap 34 on the lug nut 30. The retention feature 65 may operate by radial interference and/or contact with the external lobe 52 or the retention feature 65 may operate by axial interference and/or contact with the external lobe 52. Thus, the retention feature 65 may be configured as a radial retention feature 66, as described here, or as an axial retention feature 92, to be described in more detail with reference to FIG. 7A below. In the embodiment shown in FIGS. 3A-3C, radial interference and/or contact between the radial retention feature 66 and the external lobe 52 retains the nut cap 34 on the lug nut 30 until a sufficient removal torque is applied to the nut cap 34 by the tool 38. The internal cam 50 may include both the stop 63 and the retention feature 65. The internal cam 50 may be configured to lead the external lobe 52 sequentially toward the retention feature 65 and then the stop 63.

The internal cam 50 may include a radial cam lead-in 68. The radial cam lead-in 68 may be configured to facilitate smooth cooperation between the internal cam 50 and the external lobe 52 in the radial direction when the nut cap 34 is rotated with respect to the lug nut 30. The radial cam lead-in 68 may be a radius, a chamfer, or any other radial shape that provides for smooth cooperation between the internal cam 50 and the external lobe 52 in the radial direction as the nut cap 34 is rotated relative to the lug nut 30.

The internal cam 50 may include a radial cam lead-out 70. The radial cam lead-out 70 may be configured to facilitate smooth cooperation between the internal cam 50 and the external lobe 52 in the radial direction as the nut cap 34 is rotated with respect to the lug nut 30. The radial cam lead-out 70 may be a radius, a chamfer, or any other radial shape that provides for smooth cooperation between the internal cam 50 and the external lobe 52 in the radial direction as the nut cap 34 is rotated relative to the lug nut 30.

FIGS. 4A-4B show alternative embodiments of the external lobe 52. In FIG. 4A, the external lobe 52 is embodied as a partial cylinder lobe 72. In FIG. 4B, the external lobe 52 is embodied as a wall and gusset lobe 74. The external lobe 52 may be shaped in these and other ways as necessary to facilitate reduced manufacturing cost or to facilitate improved performance.

FIG. 5 shows an alternative embodiment of nut cap 34. In this embodiment, a plurality of radial rim segments 76 are formed in the rim 54. A plurality of radial rim segment edges 77 are spaced around the rim 54 to split the rim 54 into the radial rim segments 76. This configuration may facilitate smooth cooperation between the internal cam 50 and the external lobe 52 in the radial direction as the nut cap 34 is rotated relative to the lug nut 30 and the radial retention feature 66 interferes with the external lobe 52.

Figure 6:
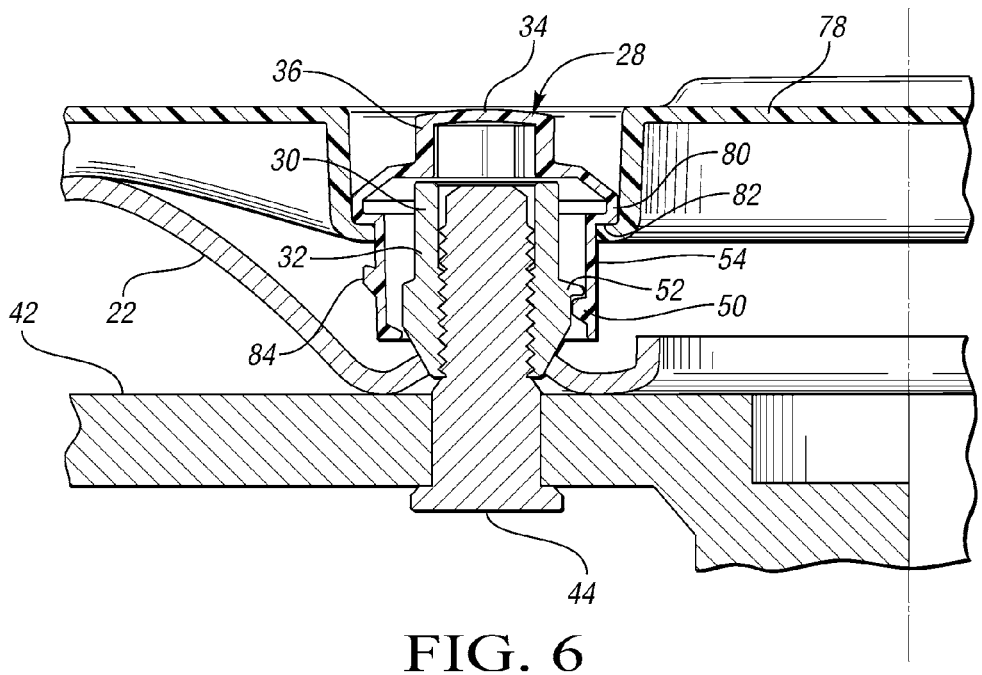
FIG. 6 is a fragmentary schematic side view section of a wheel attached to a vehicle using another embodiment of the turn limited lug nut and nut cap combination, where the nut cap is also used to attach a wheel cover to the wheel.

FIG. 6 is another embodiment of the turn limited lug nut and nut cap combination 28. In this embodiment, the nut cap 34 is used to attach a wheel cover 78 to the wheel 22, in addition to covering the lug nut 30. The nut cap rim 54 has a wheel cover retaining feature 80 to attach the wheel cover 78 to the wheel 22 via the lug nut 30. The wheel cover retaining feature 80 may be a shoulder 82 formed on the nut cap rim 54 or may be any other feature suitable for retaining the wheel cover 78 on the wheel 22.

The nut cap rim 54 may be configured with an external rim lobe 84 to preliminarily attach the nut cap 34 to the wheel cover 78. The external rim lobe 84 is configured to retain the nut cap 34 on the wheel cover 78 when the nut cap 34 is not located to the lug nut 30. Thus, the external rim lobe 84 may function to create a manufacturing subassembly including the wheel cover 78 and the nut cap 34 and also may function to keep the nut cap 34 retained in the wheel cover 78 when the wheel 22 is removed from the vehicle 20 for service.

Figure 7A:
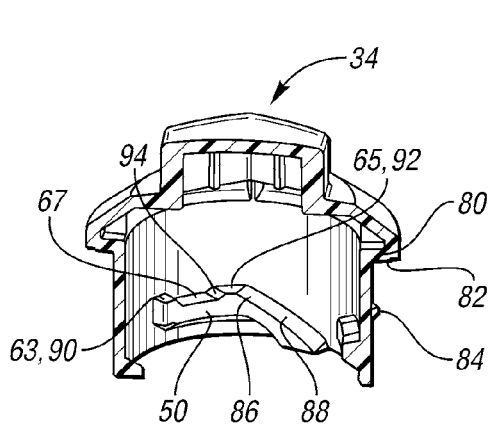
FIG. 7A is a schematic perspective section of the nut cap of FIG. 6 when the nut cap is dislocated from the lug nut.
Figure 7B:
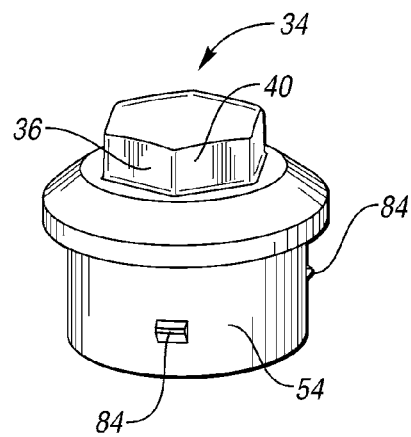
FIG. 7B is a schematic perspective view of the exterior of the nut cap of FIG. 6 when the nut cap is dislocated from the lug nut.

Referring now to FIG. 7A-7B, in this embodiment the internal cam 50 includes an axial cam lead-in 86 which is in the form of a lead-in thread 88. The lead-in thread 88 cooperates with the external lobe 52 of the lug nut 30 to urge the wheel cover retaining feature 80 against the wheel cover 78 and the wheel cover 78 against the wheel 22 when the nut cap 34 is partially turned with respect to the lug nut 30.

The nut cap 34 includes an axial cam surface 67. The axial cam surface 67 may be configured to contact and/or interfere with the lug nut axial lobe surface 62 in the axial direction as the nut cap 34 is rotated with respect to the lug nut 30 and when the nut cap 34 is located to the lug nut 30.

The nut cap 34 includes the stop 63. The stop 63 may be part of the internal cam 50. The stop 63 cooperates with the external lobe 52 to limit the partial turn of the nut cap 34 with respect to the lug nut 30. In this embodiment, the stop 63 operates by axial interference and/or contact with the external lobe 52. Thus, the stop 63 is configured as an axial stop 90. Axial interference and/or contact between the axial stop 90 and the external lobe 52 prevents the nut cap 34 from being turned beyond the axial stop 90. The axial stop 90 may cooperate with the external lobe 52 to limit the turn of the nut cap 34 with respect to the lug nut 30 to part of a turn. When the nut cap 34 is turned part of a turn to the stop 63, the nut cap 34 is located to the lug nut 30. The nut cap 34 may be dislocated from the lug nut 30 when the nut cap 34 is turned part of a turn with respect to the lug nut 30 in the opposite direction from the stop 63. Additionally, the stop 63 is shaped such that when an excessive torque is applied to the nut cap 34 by the tool 38, the stop 63 may be overcome and the nut cap 34 may be dislocated from the lug nut 30.

The nut cap 34 also includes the retention feature 65. The retention feature 65 may be part of the internal cam 50. The retention feature 65 cooperates with the external lobe 52 to retain the nut cap 34 on the lug nut 30. In this embodiment, the retention feature 65 operates by axial interference and/or contact with the external lobe 52. Thus, the retention feature 65 is configured as an axial retention feature 92. Axial interference and/or contact between the axial retention feature 92 and the external lobe 52 retains the nut cap 34 on the lug nut 30 until a sufficient removal torque is applied to the nut cap 34 by the tool 38. The internal cam 50 may include both the stop 63 and the retention feature 65.

The internal cam 50 may include an axial cam lead-out 94. The axial cam lead-out 94 may be configured to facilitate smooth cooperation between the internal cam 50 and the external lobe 52 in the axial direction as the nut cap 34 is rotated with respect to the lug nut 30. The axial cam lead-out 94 may be a radius, a chamfer, or any other axial shape that provides for smooth cooperation between the internal cam 50 and the external lobe 52 as the nut cap 34 is rotated relative to the lug nut 30.

Figure 8:
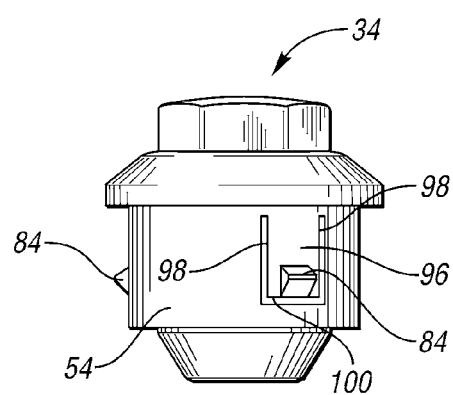
FIG. 8 is a side view of the lug nut and nut cap combination of FIG. 6 when the nut cap is located on the lug nut, which also shows an alternative embodiment of the nut cap of FIG. 7A-7B.

FIG. 8 shows another embodiment of the nut cap 34. In this embodiment, a partial rim segment 96 is formed in the rim 54. A partial rim segment circumferential edge 98 and a partial rim segment axial edge 100 may partially separate the partial rim segment 96 from the rim 54. The external rim lobe 84 is disposed on the partial rim segment 96. This configuration may reduce the force needed to attach the nut cap 34 to the wheel cover 78.

This invention also applies to vehicles having wheels that are attached to the axle via bolts. A bolt and bolt cap configuration similar to the disclosed lug nut and nut cap configuration could be used in this type of vehicle.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A turn limited wheel lug nut and nut cap combination comprising:

a lug nut for retaining a wheel on a vehicle, the lug nut having an external lobe; and a nut cap, turnable with respect to the lug nut, the nut cap having:

an internal cam, cooperable with the external lobe to locate the nut cap with respect to the lug nut with not more than a partial turn;

a stop, cooperable with the external lobe to limit the partial turn of the nut cap with respect to the lug nut; and a retention feature, cooperable with the external lobe to retain the nut cap on the lug nut.

2. The combination of claim 1, wherein the external lobe is neither rolled nor machined and is not a thread.

3. The combination of claim 2, wherein the external lobe is forged.

4. The combination of claim 1, wherein the internal cam is configured to lead the external lobe sequentially toward the retention feature and then the stop.

5. The combination of claim 1, wherein the stop or the retention feature operates by radial interference or contact with the external lobe.

6. The combination of claim 1, wherein the stop or the retention feature operates by axial interference or contact with the external lobe.

7. The combination of claim 1, wherein the stop is configured to limit the turn of the nut cap with respect to the lug nut to part of a turn in one direction to the stop, whereby to locate the nut cap with respect to the lug nut.

8. The combination of claim 7, wherein the nut cap is dislocatable from the lug nut when the nut cap is turned part of a turn with respect to the lug nut in the opposite direction from the stop.

9. The combination of claim 1, wherein the nut cap has a rim configured to substantially conceal where the lug nut retains the wheel on the vehicle.

10. The combination of claim 9, wherein the rim of the nut cap has a wheel cover retaining feature for attaching a wheel cover to the wheel via the lug nut, and wherein the internal cam has a lead-in thread segment, cooperable with the external lobe of the lug nut to urge the wheel cover retaining feature against the wheel cover and the wheel cover against the wheel when the nut cap is partially turned with respect to the lug nut.

11. The combination of claim 10, wherein the stop limits the turn of the nut cap with respect to the lug nut to part of a turn in one direction to the stop, whereby to locate the nut cap with respect to the lug nut.

12. The combination of claim 11, wherein the nut cap is dislocatable from the lug nut when the nut cap is turned part of a turn with respect to the lug nut in the opposite direction from the stop.

13. The combination of claim 1, wherein the nut cap is non-metallic.

14. The combination of claim 1, wherein the combination further comprises a wheel cover; wherein the nut cap has a rim; and wherein the rim has an external rim lobe configured to preliminarily attach the nut cap to the wheel cover as a subassembly.

15. The combination of claim 1, wherein the nut cap has an external lobe for joining the nut cap and the wheel cover when the nut cap is dislocated from the lug nut.

16. A vehicle comprising:

an axle operatively connected to the vehicle;

a wheel mounting stud attached to the axle;

a wheel attachable to the axle on the wheel mounting stud; and a combination comprising:

a lug nut for retaining the wheel on the wheel mounting stud, the lug nut having an external lobe; and a nut cap, turnable with respect to the lug nut, the nut cap having:

an internal cam, cooperable with the external lobe to locate the nut cap with respect to the lug nut with not more than a partial turn;

a stop, cooperable with the external lobe to limit the partial turn of the nut cap with respect to the lug nut; and a retention feature, cooperable with the external lobe to retain the nut cap on the lug nut.

17. The vehicle of claim 16, wherein the stop limits the turn of the nut cap with respect to the lug nut to part of a turn in one direction to the stop, whereby to locate the nut cap with respect to the lug nut.

18. The vehicle of claim 17, wherein the nut cap is dislocatable from the lug nut when the nut cap is turned part of a turn with respect to the lug nut in the opposite direction from the stop.

19. The vehicle of claim 16, further comprising a wheel cover attachable to the wheel;

wherein the nut cap has a rim configured with an external rim lobe to preliminarily attach the nut cap to the wheel cover;

wherein the rim has a wheel cover retaining feature to attach the wheel cover to the wheel via the lug nut;

wherein the internal cam has a lead-in thread cooperable with the external lobe to urge the wheel cover retaining feature against the wheel cover and the wheel cover against the wheel when the nut cap is turned with respect to the lug nut; and wherein the stop limits the turn of the nut cap with respect to the lug nut to part of a turn in one direction to the stop, whereby to locate the nut cap with respect to the lug nut.

20. The vehicle of claim 19, wherein the nut cap is dislocatable from the lug nut when the nut cap is turned part of a turn with respect to the lug nut in the opposite direction from the stop.

* * * * *